(12) United States Patent
Minemura et al.

(10) Patent No.: US 9,418,302 B2
(45) Date of Patent: Aug. 16, 2016

(54) METHOD AND APPARATUS FOR RECOGNIZING ROAD SHAPE (71) Applicant: DENSO CORPORATION, Kariya, Aichi-pref. (JP)

(72) Inventors: Akitoshi Minemura, Kariya (JP); Taku Sakima, Chiryu (JP); Yuusuke Matsumoto, Aichi-ken (JP); Masayoshi Takeda, Kariya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 78 days.

(21) Appl. No.: 14/471,372

(22) Filed: Aug. 28, 2014

(65) Prior Publication Data

US 2015/0063648 A1   Mar. 5, 2015

(30) Foreign Application Priority Data

Aug. 29, 2013   (JP) ................. 2013-178363

(51) Int. Cl.
*G06K 9/00* (2006.01)
*G06K 9/62* (2006.01)

(52) U.S. Cl.
CPC .......... *G06K 9/00798* (2013.01); *G06K 9/6217* (2013.01)

(58) Field of Classification Search
None
See application file for complete search history.

(56) References Cited

U.S. PATENT DOCUMENTS

| | | | | |
|---|---|---|---|---|
| 4,906,940 A * | 3/1990 | Greene | ............... | G06K 9/00798 382/100 |
| 5,922,036 A * | 7/1999 | Yasui | ..................... | G01C 21/26 342/436 |
| 6,091,833 A * | 7/2000 | Yasui | ................... | G05D 1/0246 348/118 |
| 7,933,433 B2 * | 4/2011 | Ogawa | ................... | G01S 17/936 382/104 |
| 8,543,254 B1 * | 9/2013 | Schut | ........................ | B60T 7/22 348/135 |
| 2001/0020201 A1 | 9/2001 | Shirai et al. | | |
| 2001/0037165 A1 * | 11/2001 | Shirai | .................... | B60W 30/16 701/1 |
| 2003/0135308 A1 * | 7/2003 | Richardson | ............. | G01S 7/411 701/23 |
| 2005/0086000 A1 * | 4/2005 | Tsuchiya | ............... | G08G 1/166 701/538 |
| 2008/0056535 A1 * | 3/2008 | Bergmann | ............. | G01C 21/30 382/103 |
| 2011/0235861 A1 * | 9/2011 | Nitanda | ............. | G06K 9/00798 382/103 |
| 2012/0185167 A1 * | 7/2012 | Higuchi | ............. | G01C 21/3602 701/461 |

(Continued)

FOREIGN PATENT DOCUMENTS

JP   2000-215396       8/2000
JP   2001256600 A  *  9/2001

(Continued)

OTHER PUBLICATIONS

Office Action mailed Jun. 30, 2015 in corresponding JP Application No. 2013-178363 with English translation.

*Primary Examiner* — Wenpeng Chen
(74) *Attorney, Agent, or Firm* — Harness, Dickey & Pierce, P.L.C.

(57) ABSTRACT

A method and an apparatus are provided to recognize a shape of a road on which a vehicle is traveling. Road edge shapes on a left side and a right side of the vehicle are recognized, from positions of roadside objects detected based on detection information from an on-board radar. Lane shapes that are shapes of lane boundary lines on the left side and the right side of the vehicle are recognized, from positions of lane boundary lines detected based on an image captured by an on-board camera. For each of the left side and the right side, such that the recognized road edge shape and the recognized lane shape are compared with each other, and the road shape is identified based on the comparison results.

19 Claims, 6 Drawing Sheets

(56) References Cited

U.S. PATENT DOCUMENTS

| | | | | |
|---|---|---|---|---|
| 2012/0219190 | A1* | 8/2012 | Kumagai | G06T 7/0065 382/104 |
| 2012/0271483 | A1* | 10/2012 | Samukawa | B60W 50/14 701/1 |

FOREIGN PATENT DOCUMENTS

| | | |
|---|---|---|
| JP | 3417375 | 6/2003 |
| JP | 2012-242934 | 12/2012 |
| JP | 2012-242935 | 12/2012 |

* cited by examiner

[RIGHT SIDE: EXAMPLE OF NON-RECOGNITION BY RADAR]

FIG.3B

[LEFT AND RIGHT SIDES: EXAMPLE OF NON-RECOGNITION BY RADAR]

FIG.4

[LEFT SIDE: EXAMPLE OF SHAPES NOT WITHIN SAME RANGE]

FIG.5

[ESTIMATED R CORRECTION]

FIG.6

[EXAMPLE OF DIVIDED AREAS]

METHOD AND APPARATUS FOR RECOGNIZING ROAD SHAPE

CROSS-REFERENCE TO RELATED APPLICATION

This application is based on and claims the benefit of priority from earlier Japanese Patent Application No. 2013-178363 filed Aug. 29, 2013, the description of which is incorporated herein by reference.

BACKGROUND OF THE INVENTION

1. Field of the Invention

The present invention relates to a technology for recognizing the shape of a road on which a vehicle is traveling.

2. Description of the Related Art

Conventionally, a road shape recognition apparatus is known that recognizes the shape of a road on which a vehicle is traveling, based on the position of a roadside object (refer to, for example, JP-B-3417375, JP-A-2012-242934, and JP-A-2012-242935). For detecting the roadside object, a transmission wave, such as an optical wave or a millimeter-wave is radiated over a predetermined angle ahead of or to the side of the vehicle and a reflection wave thereof is received.

In the conventional road shape recognition apparatus, in a situation in which the position of a roadside object can be continuously detected, such as when the roadside object is a traffic strip composed of a structure such as a guardrail or shrubbery, a fence, or a block wall, the road shape can be recognized. However, in a situation in which the position of a roadside object is discontinuously detected, such as when the roadside object is a roadside tree or a building, a problem occurs in that recognition accuracy significantly decreases. In addition, in a situation in which a roadside object is not present to begin with, such as when the vehicle is traveling on an embankment, the road shape cannot be recognized.

Therefore, road shape recognition using a known white-line detection technology that uses a camera can be considered. However, in a situation in which the white line is faded, for example, recognition accuracy significantly decreases. In a situation in which a white line is not present to begin with, the road shape cannot be recognized.

SUMMARY

Hence it is desired to provide a technology for improving recognition accuracy in road shape recognition that uses a radar and a camera.

A road shape recognition method of an exemplary embodiment includes a first recognizing step, a second recognizing step, and a road shape identifying step.

At the first recognizing step, road edge shapes on the left side and the right side of a vehicle are recognized from the positions of roadside objects detected based on detection information from an on-board radar.

At the second recognizing step, lane shapes that are the shapes of lane boundary lines (such as white lines) on the left side and the right side of the vehicle are recognized from the positions of the lane boundary lines detected based on an image captured by an on-board camera.

At the road shape identifying step, for each of the left side and the right side, the road edge shape recognized at the first recognizing step and the lane shape recognized at the second recognizing step are compared. The road shape (the shape of the road on which the vehicle is traveling) is identified based on the comparison results.

In a configuration such as this, the shape of the road on which the vehicle is traveling is identified using the recognition results based on detection by both the on-board radar and the on-board camera and the recognition results for both the left side and the right side of the vehicle. Situations in which detection is difficult differ between the on-board radar and the on-board camera. In such situations, as a result of the configuration, the recognition results of either of the on-board radar and the on-board camera can compensate for the recognition results of the other. In addition, the recognition results for either of the left side and the right side can compensate for the recognition results of the other side.

Therefore, in the road shape recognition method of the exemplary embodiment, the recognition results based on detection by both the on-board radar and the on-board camera are compared. In addition, the recognition results for both the left side and the right side of the vehicle are compared. A suitable road shape can be identified based on the comparison results. As a result, recognition accuracy can be improved.

In addition, a road shape recognition apparatus according to the exemplary embodiment is mounted in a vehicle. The road shape recognition apparatus includes a first recognizing means (corresponding to the above-described first recognizing step), a second recognizing means (corresponding to the above-described second recognizing step), a determining means, and an identifying means.

The determining means determines, for each of the left side and the right side, whether or not a degree of coincidence between the road edge shape recognized by the first recognizing means and the lane shape recognized by the second recognizing means is high. The identifying means identifies the road shape by processes different depending on the determination results.

In a configuration such as this, situations in which detection is difficult differ between the on-board radar and the on-board camera. However, for reasons similar to those described above, in such situations, the recognition results of either of the on-board radar and the on-board camera can compensate for the recognition results of the other. In addition, the recognition results for either of the left side and the right side can compensate for the recognition results of the other side.

Therefore, in the road shape recognition apparatus of the exemplary embodiment, the degree of coincidence is determined for the recognition results based on detection by both the on-board radar and the on-board camera. In addition, the degree of coincidence is determined for the recognition results for both the left side and the right side of the vehicle. A suitable road shape can be identified based on the determination results. As a result, recognition accuracy can be improved.

In addition, the exemplary embodiment may be distributed on the market as a program. Specifically, the program enables a computer to function as the above-described first recognizing means, second recognizing means, determining means, and identifying means.

The program can achieve effects equal to the effects achieved by the road shape recognition apparatus of the exemplary embodiment by being incorporated in a single or a plurality of computers. The program of the exemplary embodiment may be stored in a read-only memory (ROM), a flash memory, or the like that is assembled in a computer as a recording device. The program may be loaded onto the computer from the ROM, the flash memory, or the like, and used. Alternatively, the program may be loaded onto a computer over a network.

In addition, the above-described program may be used so as to be recorded in a recording device (recording medium) of any computer-readable form. The recording medium includes, for example, a portable semiconductor memory (such as a universal serial bus (USB) memory or a memory card (registered trademark)).

DETAILED DESCRIPTION OF THE PREFERRED EMBODIMENTS

First Embodiment

A first embodiment of the present invention will hereinafter be described with reference to the drawings.

The present invention is not limited in interpretation in any way by the embodiment described below. An aspect in which a part of the embodiment described below has been omitted to an extent enabling the problems to be solved is also an embodiment of the present invention. In addition, any aspect conceivable without departing from the essence of the invention specified by only the expressions recited in the scope is also an embodiment of the present invention. In addition, reference numbers used in the description of the embodiment below are used accordingly in the scope of claims. However, the reference numbers are used for the purpose of facilitating understanding of the invention in each claim and are not intended to limit the technical scope of the invention in each claim.

<Configuration of a Road Shape Recognition Apparatus>

Figure 1A:
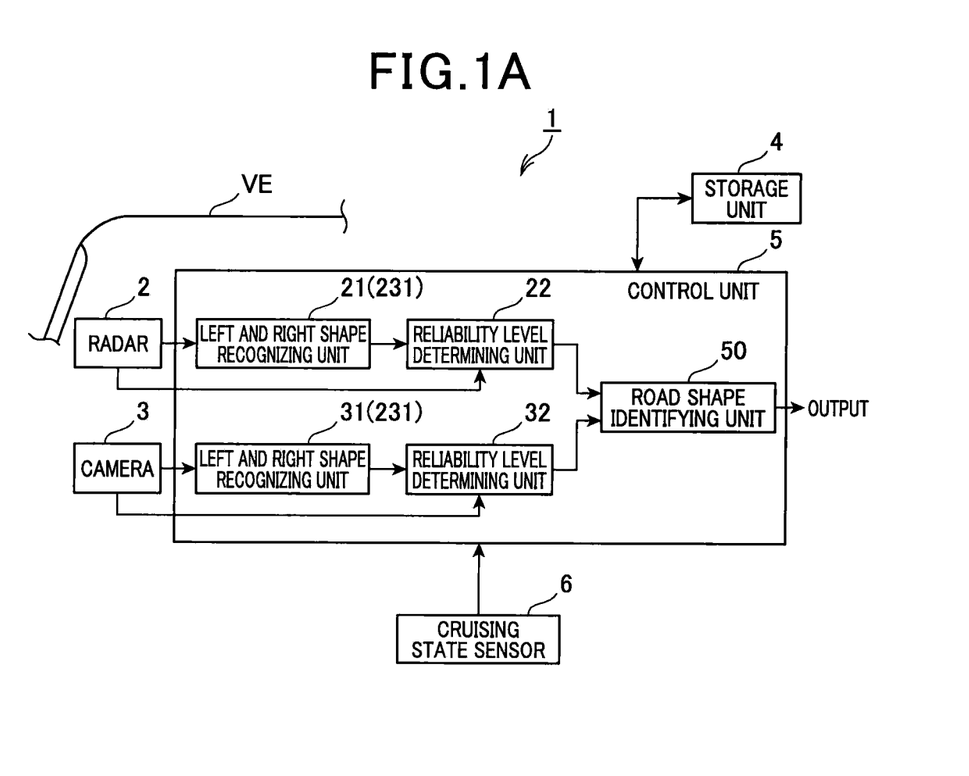
FIG. 1A is a block diagram of an example of a configuration of a road shape recognition apparatus 1.

A road shape recognition apparatus 1 shown in FIG. 1A is mounted in a vehicle. The road shape recognition apparatus 1 recognizes the shape of the road on which the vehicle (the vehicle in which the road shape recognition apparatus 1 is mounted) is traveling. The road shape recognition apparatus 1 includes an on-board radar 2, an on-board camera 3, a storage unit 4, a control unit 5, and a cruising state sensor 6.

The on-board radar 2 according to the present embodiment is a millimeter-wave radar that is used to detect a target using millimeter waves. The on-board radar 2 is attached to the center of the front side (tip position) of the vehicle. The millimeter-wave radar transmits a millimeter-wave towards the front and the side of the vehicle while scanning within a horizontal plane. The millimeter-wave radar then receives a reflected millimeter-wave, thereby obtaining transmission and reception data. The millimeter-wave radar transmits the transmission and reception data to the control unit 5 as a radar signal (according to the present embodiment, the radar signal includes information indicating the reception strength of the millimeter wave). The on-board radar 2 is not limited to a millimeter-wave radar such as this. A known laser radar, ultrasonic radar, or the like can also be used. In addition, a single on-board radar 2 may be provided. Alternatively, a plurality of on-board radars 2 may be provided.

The on-board camera 3 according to the present embodiment is a single-lens camera that is composed of a single charge-coupled device (CCD) camera. The on-board camera 3 is attached to the center of the front side of the vehicle. The single-lens camera transmits data of an image captured by the CCD camera to the control unit 5 as an image signal (according to the present embodiment, the image signal includes information indicating the luminance of each pixel). The on-board camera 3 is not limited to a single-lens camera such as this. A known stereo camera or the like can also be used. In addition, a single on-board camera 3 may be provided. Alternatively, a plurality of on-board cameras 3 may be provided.

The storage unit 4 is a non-volatile memory that stores therein various pieces of data, programs, and the like.

The control unit 5 is an electronic control unit that performs integrated control of the road shape recognition apparatus 1. The control unit 5 includes a central processing unit (CPU), a read-only memory (ROM), a random access memory (RAM), and the like. In addition, the control unit 5 includes, as functional configurations, a left and right shape recognizing unit 21, a left and right shape recognizing unit 31, a reliability level determining unit 22, a reliability level determining unit 32, and a road shape identifying unit 50. The CPU of the control unit 5 uses the RAM as a work area and performs various processes to actualize the functions as the left and right shape recognizing unit 21, the left and right shape recognizing unit 31, the reliability level determining unit 22, the reliability level determining unit 32, and the road shape identifying unit 50, based on the programs stored in the ROM or the storage unit 4. In addition, the control unit 5 receives the radar signals from the on-board radar 2 and the image signals from the on-board camera 3 at fixed intervals based on a master clock of the CPU.

The cruising state sensor 6 is composed of a plurality of sensors that detect the cruising state of the vehicle. As the plurality of sensors, for example, a vehicle speed sensor, an acceleration sensor, a steering angle sensor, and a yaw rate sensor are used. The vehicle speed sensor detects the speed (vehicle speed) of the vehicle. The acceleration sensor detects the acceleration of the vehicle. The steering angle sensor detects the steering angle of the vehicle. The yaw rate sensor detects the yaw rate of the vehicle.

The left and right shape recognizing unit 21 is connected to the on-board radar 2. The left and right shape recognizing unit 21 first detects a target based on the radar signal transmitted from the on-board radar 2 (detection information from the on-board radar 2). Specifically, the left and right shape recognizing unit 21 first calculates (identifies) a linear distance from the vehicle to the target and a horizontal direction position (angular position) of the target, based on the radar signal. Then, the left and right shape recognizing unit 21 calculates (identifies) the positional coordinates of the target in relation to the vehicle as a detection point, based on the calculated values. Next, the left and right recognizing unit 21 determines whether or not the target is a roadside object based on the continuity of the detection points of the target, the position in relation to the vehicle, changes over time, and the like. The left and right shape recognizing unit 21 performs determination of a roadside object for both the left side and the right side of the vehicle. The left and right shape recognizing unit 21 sends, to the reliability level determining unit 22, information (referred to, hereinafter, as "roadside object detection quantity information") indicating the number of detection points that have been detected as constituent elements of the roadside object (positional coordinates on the side facing the cruising road) for the left side and for the right side.

Then, when the target is detected as a roadside object, the left and right shape recognizing unit 21 recognizes a road edge shape based on the position of the roadside object. The road edge shape is the shape of the road edge of the road on which the vehicle is traveling. The left and right shape recognizing unit 21 performs recognition of the road edge shape for the left side and the right side of the vehicle. When the road edge shapes of both the left side and the right side are recognized, the left and right shape recognizing unit 21 sends information (referred to, hereinafter, as "road edge shape information") indicating the road edge shape of the left side and the road edge shape of the right side to the road shape identifying unit 50. When the road edge shapes of both the left side and the right side are not recognized, the left and right shape recognizing unit 21 sends information (referred to, hereinafter, as "unrecognized road edge information") identifying the side (either side or both sides) for which the road edge shape could not be recognized to the road shape identifying unit 50. In addition, the road edge shape information according to the present embodiment is information indicating an aggregation of detection points (positional coordinates) of which the quantity is indicated in the above-described roadside object detection quantity information.

The reliability level determining unit 22 is connected to the on-board radar 2. The reliability level determining unit 22 determines the reliability level (referred to, hereinafter, as a "first reliability level") of the recognition result of the road edge shape by the left and right shape recognizing unit 21, based on the radar signal from the on-board radar 2 and the roadside object detection quantity information from the left and right shape recognizing unit 21. The reliability level determining unit 22 determines the first reliability levels for both the left side and the right side of the vehicle. The reliability level determining unit 22 then sends information (referred to, hereinafter, as "first reliability level information") indicating the first reliability level for the left side and the first reliability level for the right side to the road shape identifying unit 50.

The first reliability level is, for example, set to be higher as the number of detection points indicated in the roadside object detection quantity information increases. The first reliability level is set to be higher as the reception strength of the millimeter wave indicated by the radar signal increases. Conversely, the first reliability level is set to be lower as the number of detection points decreases. The first reliability level is set to be lower as the reception strength decreases.

On the other hand, the left and right shape recognizing unit 31 is connected to the on-board camera 3. The left and right shape recognizing unit 31 first detects an edge point for each horizontal line in a captured image, based on the image signal (image captured by the on-board camera 3) transmitted from the on-board camera 3. Specifically, the left and right shape recognizing unit 31 first extracts, as the edge point, a point at which an effective pixel value changes in accompaniment with a level difference of a predetermined threshold or more, based on the image signal. The edge point is detected for each horizontal line in the captured image. The left and right shape recognizing unit 31 then calculates (identifies) a linear distance from the vehicle to the edge point and a horizontal direction position (angular position) of the edge point.

Then, the left and right shape recognizing unit 31 calculates (identifies) the positional coordinates of the edge point in relation to the vehicle as a detection point, based on the calculated values. Next, the left and right shape recognizing unit 31 determines whether or not the edge point is a lane boundary line (such as a white line) based on the continuity of the detection points of the edge points, the position in relation to the vehicle, changes over time, and the like. The left and right shape recognizing unit 31 performs the determination of a lane boundary line for both the left side and the right side of the vehicle. The left and right shape recognizing unit 31 sends, to the reliability level determining unit 32, information (referred to, hereinafter, as "edge detection quantity information") indicating the number of detection points that have been detected as constituent elements of the lane boundary line (positional coordinates of a plurality of edge points on the cruising road side) for the left side and for the right side.

Then, when the plurality of edge points are detected as a lane boundary line, the left and right shape recognizing unit 31 recognizes a lane shape based on the positions of the edge points. The lane shape is the shape of the lane boundary line defining the lane on which the vehicle is traveling. The left and right shape recognizing unit 31 performs recognition of the lane shape for both the left side and the right side of the vehicle. When the lane shapes of both the left side and the right side are recognized, the left and right shape recognizing unit 31 sends information (referred to, hereinafter, as "lane shape information") indicating the lane shape of the left side and the lane shape of the right side to the road shape identifying unit 50. When the lane shapes of both the left side and the right side are not recognized, the left and right shape recognizing unit 31 sends information (referred to, hereinafter, as "unrecognized lane information") identifying the side (either side or both sides) for which the lane shape could not be recognized to the road shape identifying unit 50.

In addition, the lane shape information according to the present embodiment is information indicating an aggregation of detection points (positional coordinates of the edge points) of which the quantity is indicated in the above-described edge detection quantity information. Specifically, for example, a plurality of lane boundary lines, rather than a single lane boundary line, may be present on either the left side or the right side. Alternatively, a plurality of white lines or the like may be arranged at an angle within a predetermined area, such as at a crosswalk, on either the left side or the right side. In such instances, the inner white line or the like that is closest to the cruising road is considered to be the lane boundary line. The lane shape information according to the present invention is information indicating an aggregation of the positional coordinates of the edge points that are further on the inner side of the lane boundary line.

The reliability level determining unit 32 is connected to the on-board camera 3. The reliability level determining unit 32 determines the reliability level (referred to, hereinafter, as a "second reliability level") of the recognition result of the lane shape by the left and right shape recognizing unit 31, based on the image signal from the on-board camera 3 and the edge detection quantity information from the left and right shape recognizing unit 31. The reliability level determining unit 32 determines the second reliability levels for both the left side and the right side of the vehicle. The reliability level determining unit 32 then sends information (referred to, hereinafter, as "second reliability level information") indicating the second reliability level for the left side and the second reliability level for the right side to the road shape identifying unit 50.

The second reliability level is, for example, set to be higher as the number of detection points indicated in the edge detection quantity information increases. The second reliability level is set to be higher as the level difference (contrast) of luminance of each pixel indicated in the image signal increases. Conversely, the second reliability level is set to be lower as the number of detection points decreases. The second reliability level is set to be lower as the contrast decreases.

<Road Shape Identifying Process>

Figure 2:
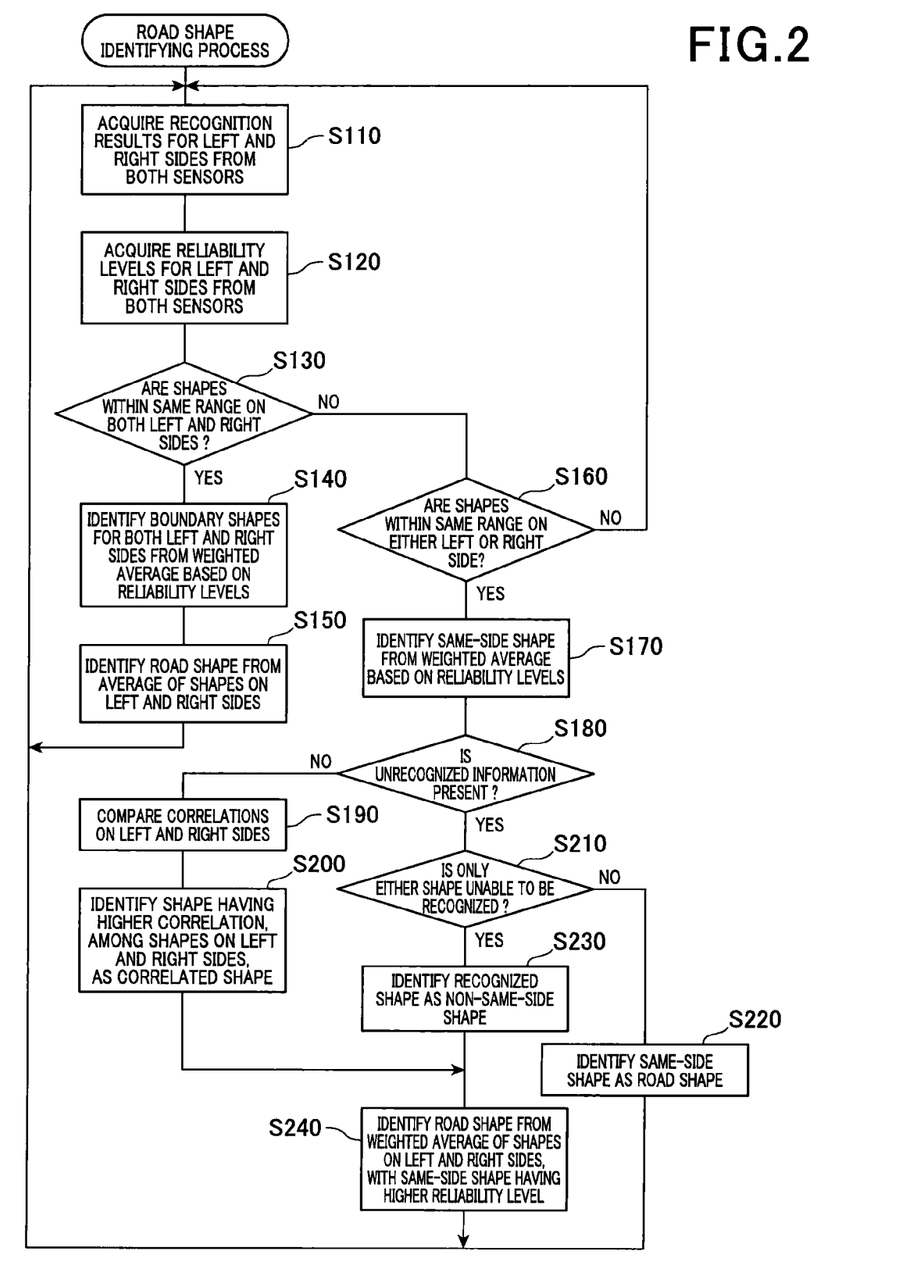
FIG. 2 is a flowchart of an example of the details of a road shape identifying process performed by a control unit 5 of the road shape recognition apparatus 1.

Next, a process (referred to, hereinafter, as a "road shape identifying process") that is performed by the control unit 5 to actualize the function as the road shape identifying unit 50 will be described with reference to the flowchart in FIG. 2. The process shown in FIG. 2 is repeatedly performed at a predetermined cycle. The control unit 5 that performs the road shape identifying process will hereinafter be referred to as the road shape identifying unit 50 in the description.

When the road shape identifying process is started, at S110, the road shape identifying unit 50 acquires the recognition results from the left and right shape recognizing unit 21 that is connected to the on-board radar 2 and the left and right shape recognizing unit 31 that is connected to the on-board camera 3. The on-board radar 2 and the on-board camera 3 may be referred to, hereinafter, as "both sensors 2 and 3". Specifically, the road shape identifying unit 50 receives at least either of the road edge shape information and the unrecognized road edge information from the left and right shape recognizing unit 21. The road shape identifying unit 50 also receives at least either of the lane shape information and the unrecognized lane information from the left and right shape recognizing unit 31.

At subsequent S120, the road shape identifying unit 50 acquires the determination results from the reliability level determining unit 22 that is connected to the on-board radar 2 and the reliability level determining unit 32 that is connected to the on-board camera 3. Specifically, the road shape identifying unit 50 receives the first reliability information related to the recognition results of the road edge shapes on the left and right sides from the reliability level determining unit 22. The road shape identifying unit 50 also receives the second reliability information related to the recognition results of the lane shapes on the left and right sides from the reliability level determining unit 32.

Then, at S130, the road shape identifying unit 50 determines, separately for the left side and the right side, whether or not the road edge shape indicated in the road edge shape information and the lane shape indicated in the vehicle shape information are within a range that allows the road edge shape and the lane shape to be considered to be the same shape (referred to, hereinafter, as "within the same range"). The road shape identifying unit 50 makes the determination under a condition that neither the unrecognized road edge information nor the unrecognized lane information is included in the information received from the left and right shape recognizing unit 21 and the left and right shape recognizing unit 31 at S110.

Specifically, when determined that the road edge shape on the left side of the vehicle and the lane shape on the left side are within the same range, and the road edge shape on the right side and the lane shape on the right side are within the same range, the road shape identifying unit 50 proceeds to S140. When determined otherwise, the road shape identifying unit 50 proceeds to S160. According to the present embodiment, for both the left side and the right side, the road shape identifying unit 50 compares the positional coordinates X (positional coordinates in the horizontal direction (vehicle width direction)) of the plurality of detection points (roadside objects) prescribing the road edge shape and the plurality of detection points (lane boundary line) prescribing the lane shape that have the same positional coordinate Y (positional coordinate in the cruising direction (vehicle length direction)). For example, regarding the value of difference between the road edge shape and the lane shape, when the variation width among a plurality of differing positional coordinates Y is less than a predetermined reference width, the road shape identifying unit 50 determines that the road edge shape and the lane shape are within the same range (have a high degree of coincidence). When the variation width is greater than the reference width, the road shape identifying unit 50 determines that the road edge shape and the lane shape are not within the same range (have a low degree of coincidence).

At S140, the road shape identifying unit 50 identifies a left-side shape that is a weighted average of the left-side road edge shape and the left-side lane shape. The road shape identifying unit 50 also identifies a right-side shape that is a weighted average of the right-side road edge shape and the right-side lane shape (in other words, the road shape identifying unit 50 identifies boundary shapes for both the left side and the right side). The road shape identifying unit 50 makes the identification using the reliability levels (first reliability level and second reliability level) indicated in the information (first reliability level information and second reliability level information) received from the reliability level determining units 22 and 32 at S120.

According to the present embodiment, the road shape identifying unit 50 compares the first reliability level of the recognition result for the left-side road edge shape and the second reliability level of the recognition result for the left-side lane shape. The road shape identifying unit 50 then weights the positional coordinates X having the same positional coordinate Y, based on the respective reliability levels. The road shape identifying unit 50 then averages the weighted positional coordinates X and uses the average positional coordinate X (positional coordinate Y remains the same) to identify a new left-side shape. In addition, the road shape identifying unit 50 identifies a new right-side shape using a similar method, using the first reliability level of the recognition result of the right-side road edge shape and the second reliability level of the recognition result of the right-side lane shape.

Then, at subsequent S150, the road shape identifying unit 50 identifies the average shape of the left-side shape and the right-side shape identified at S140 as the road shape of the road on which the vehicle is traveling. The road shape identifying unit 50 then returns to S110. According to the present embodiment, the road shape is identified using a positional coordinate X that is obtained by averaging the positional coordinates X of the left-side shape and the right side shape having the same positional coordinate Y (positional coordinate Y remains the same).

As described above, at S140 and S150, the road shape identifying unit 50 sets the average shape obtained from the weighted average of the road edge shape and the lane shape on the left side as the left-side shape. In addition, the road shape identifying unit 50 sets the average shape obtained from the weighted average of the road edge shape and the lane shape on the right side as the right-side shape. The road shape identifying unit 50 then identifies the average shape of the left-side shape and the right-side shape as the road shape. However, this is not limited thereto. Various other methods may be used.

For example, the road shape identifying unit 50 may set at least either of the road edge shape and the lane shape on the left side as the left-side shape. In addition, the road shape identifying unit 50 may set at least either of the road edge shape and the lane shape on the right side as the right-side shape. In this instance, for example, the road shape identifying unit 50 may compare the first reliability level and the second reliability level for each of the left side and the right side. The road shape identifying unit 50 may then identify the shape, among the road edge shape and the lane shape, having the higher reliability level as the left-side shape or the right-side shape.

In addition, for example, the road shape identifying unit 50 may calculate the total sum of the first reliability level and the second reliability level for each of the left side and the right side. The road shape identifying unit 50 may then weight the left-side shape and the right-side shape based on the respective calculation results. The road shape identifying unit 50 may identify the average shape of the weighted left-side shape and the weighted right-side shape as the road shape.

On the other hand, at S160, the road shape identifying unit 50 determines whether or not the road edge shape and the lane shape are within the same range on either the left side or the right side. In other words, the road shape identifying unit 50 determines whether or not the left-side road edge shape and the left-side lane shape are within the same range, and the right-side road edge shape and the right-side lane shape are not within the same range. Alternatively, the road shape identifying unit 50 determines whether or not the left-side road edge shape and the left-side lane shape are not within the same range, and the right-side road edge shape and the right-side lane shape are within the same range. When determined that the shapes are within the same range (have a high degree of coincidence) on either the left side or the right side as described above, the road shape identifying unit 50 proceeds to S170. When determined that the shapes are not within the same range (have a low degree of coincidence) on both the left side and the right side, the road shape identifying unit 50 returns to S110. The determination method here is as described above. Therefore, description thereof is omitted.

At S170, the road shape identifying unit 50 identifies a same-range-side shape that is the weighted average of the road edge shape and the vehicle edge shape of the side that is determined to have shapes that are within the same range at S160. The road shape identifying unit 50 makes the identification using the reliability levels (first reliability level and second reliability level) indicated in the information (first reliability level information and second reliability level information) received from the reliability level determining units 22 and 32 at S120. Here, this is not limited thereto. For example, the road shape identifying unit 50 may identify at least either of the road edge shape and the lane shape of the side that is determined to have shapes that are within the same range at S160, or a shape obtained by arithmetic average of the road edge shape and the lane shape, as the same-side shape.

At subsequent S180, the road shape identifying unit 50 determines whether or not at least either of the unrecognized road edge information and the unrecognized lane information is included in the information received from the left and right shape recognizing unit 21 and the left and right shape recognizing unit 31 at S110. In other words, the road shape identifying unit 50 determines whether or not at least either of the road edge shape and the lane shape of the side that is determined to have shapes that are not within the same range at S160 is unable to be recognized by the left and right shape recognizing unit 21 or the left and right shape recognizing unit 31. When determined that at least either of the road edge shape and the lane shape is unable to be recognized in this way, the road shape identifying unit 50 proceeds to S210. When determined that the road edge shape and the lane shape are both recognized, the road shape identifying unit 50 proceeds to S190.

At S190, the road shape identifying unit 50 sets the road edge shape and the lane shape of the side that is determined to have shapes that are not within the same range at S160 as non-same-side shapes. For each of the road edge shape and the lane shape that are the non-same-side shapes, the road shape identifying unit 50 compares the correlation with the same-side shape identified at S170. Correlation herein is expressed, for example, by the sameness of orientation (direction) or the similarity of shape (although not as strict as the degree of coincidence).

At subsequent S200, the road shape identifying unit 50 identifies the shape, among the road edge shape and the lane shape that are the non-same-side shapes, that has the higher correlation as a correlated shape, based on the comparison results at S190. The road shape identifying unit 50 then proceeds to S240. At S240 to which the road shape identifying unit 50 proceeds at this time, the road shape identifying unit 50 gives greater weight to the same-side shape identified at S170 than the correlated shape, because the same-side shape has a higher reliability level. The road shape identifying unit 50 then identifies a shape obtained from the weighted average of the shapes on both the left side and the right side as the road shape. The road shape identifying unit 50 then returns to S110.

On the other hand, at S210 to which the road shape identifying unit 50 proceeds when at least either of the road edge shape and the lane shape of the side that is determined to have shapes that are not within the same range at S160 is unable to be recognized, the road shape identifying unit 50 determines whether or not only either of the road edge shape and the lane shape is unable to be recognized. When determined that only either of the road edge shape and the lane shape is unable to be recognized in this way, the road shape identifying unit 50 proceeds to S230. When the road edge shape and the lane shape are both unable to be recognized, the road shape identifying unit 50 proceeds to S220.

At S220, the road shape identifying unit 50 identifies the same-side shape identified at S170 as the road shape and returns to S110.

At S230, the road shape identifying unit 50 uses (identifies) the result of the shape that is able to be recognized at S210 as the non-same-side shape and proceeds to S240. At S240 to which the road shape identifying unit 50 proceeds at this time, as well, the road shape identifying unit 50 gives greater weight to the same-side shape identified at S170 than the non-same-side shape, because the same-side shape has a higher reliability level. The road shape identifying unit 50 then identifies a shape obtained from the weighted average of the shapes on both the left side and the right side as the road shape. The road shape identifying unit 50 then returns to S110.

<Effects>

As described above, in the road shape recognition apparatus 1, the left and right shape recognizing unit 21 that is connected to the on-board radar 2 recognizes the road edge shapes for the left side and the right side of the vehicle. The left and right shape recognizing unit 21 performs the recognition using the position of the roadside object detected based on the detection information from the on-board radar 2. In addition, the left and right shape recognizing unit 31 that is connected to the on-board camera 3 recognizes the lane shapes for the left side and the right side of the vehicle. The lane shape is the shape of the lane boundary line The left and right shape recognizing unit 31 performs the recognition using the position of the lane boundary line (such as a white line) detected based on an image captured by the on-board camera 3.

The road shape identifying unit 50 then compares, for each of the left side and the right side, the road edge shape recognized by the left and right shape recognizing unit 21 and the lane shape recognized by the left and right shape recognizing unit 31 (specifically, the road shape identifying unit 50 determines whether or not the degree of coincidence is high on each of the left side and the right side). The road shape identifying unit 50 identifies the road shape (the shape of the road on which the vehicle is traveling) based on the comparison results (specifically, determination results).

In a configuration such as this, the shape of the road on which the vehicle is traveling is identified using the recognition results based on detection by both the on-board radar 2 and the on-board camera 3, as well as the recognition results for both the left side and the right side of the vehicle. Situations in which detection is difficult differ between the on-board radar 2 and the on-board camera 3. However, in such situations, as a result of this configuration, the recognition result from either of the on-board radar 2 and the on-board camera 3 can compensate for the recognition result from the other. In addition, the recognition result for either of the left side and the right side can compensate for the recognition result for the other side.

Therefore, in the road shape recognition apparatus 1, the recognition results based on detection by both the on-board radar 2 and the on-board camera 3 can be compared (specifically, determination based on the degree of coincidence can be performed). In addition, the recognition results for both the left side and the right side of the vehicle can be compared (specifically, determination based on the degree of coincidence can be performed). The road shape can be appropriately identified based on the comparison results. As a result, recognition accuracy can be improved.

Figure 3A:
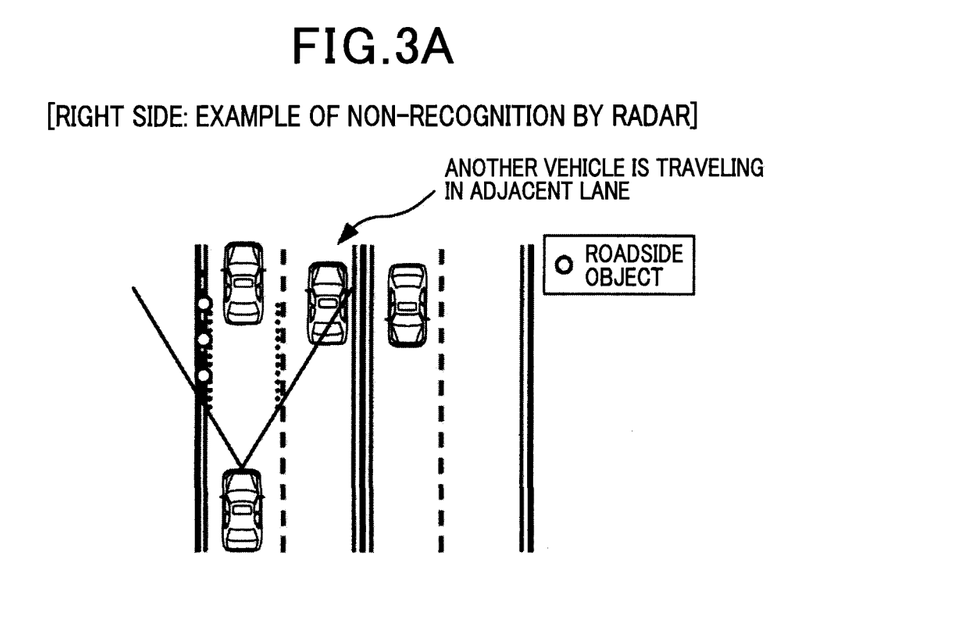
FIG. 3A and FIG. 3B are explanatory diagrams of examples of situations in which the road shape (road edge shape) is difficult to identify based only on detection information from an on-board radar 2.
Figure 3B:
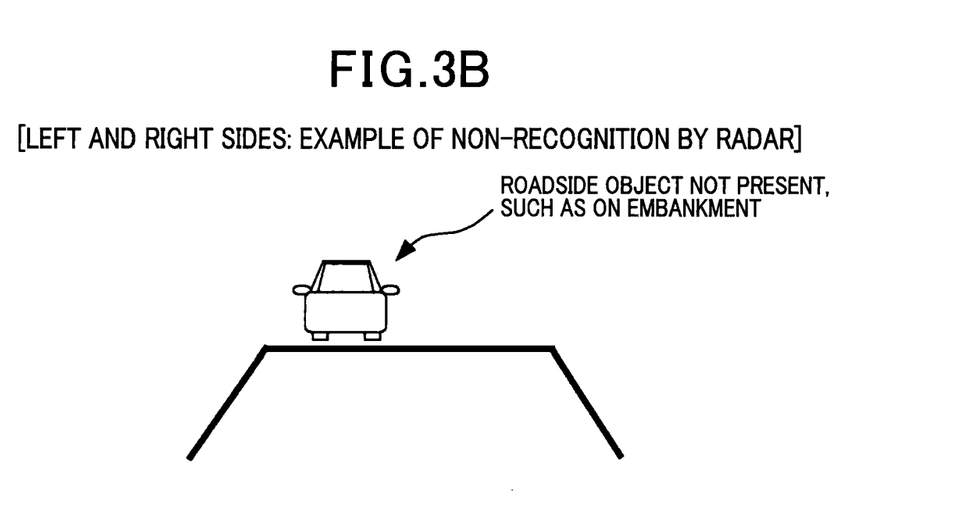

Situations in which detection by the on-board radar 2 is difficult include, for example, a situation in which another vehicle is traveling in a lane adjacent to that of the vehicle (see FIG. 3A), a situation in which a roadside object is not present, such as when the vehicle is traveling on an embankment (see FIG. 3B), and a situation in which the position of a roadside object is discontinuously detected, such as when the roadside object is a roadside tree or a building. In addition, situations in which detection by the on-board camera 3 is difficult include, for example, a situation in which the white line or the like is faded, a situation in which a white line or the like is not present to begin with, and a situation in which the vehicle is traveling in the dark, such as at night or during cloudy or rainy weather.

In addition, the road shape identifying unit 50 identifies the road shape only when the degree of coincidence on at least either of the left side and the right side is determined to be high. Therefore, when the degree of coincidence is determined to be low on both the left side and the right side, the road shape is not identified. As a result, decrease in recognition accuracy can be easily suppressed.

In addition, when the degree of coincidence is determined to be high on both the left side and the right side, the road shape identifying unit 50 sets at least either of the road edge shape and the lane shape on the left side, or an average shape of the two shapes, as the left-side shape. The road shape identifying unit 50 sets at least either of the road edge shape and the lane shape on the right side, or an average shape of the two shapes, as the right-side shape. The road shape identifying unit 50 then identifies the average shape of the left-side shape and the right-side shape as the road shape. As a result, errors in the recognition results based on detection by both the on-board radar 2 and the on-board camera 3 can be dispersed. Therefore, recognition accuracy of the road shape can be improved.

In addition, in the road shape recognition apparatus 1, the reliability level determining unit 22 that is connected to the on-board radar 2 determines, for each of the left side and the right side, the first reliability level of the recognition result of the road edge shape by the left and right shape recognizing unit 21 based on the detection information from the on-board radar 2. In addition, the reliability level determining unit 32 that is connected to the on-board camera 3 determined, for each of the left side and the right side, the second reliability level of the recognition result of the lane shape by the left and right shape recognizing unit 31 based on the detection information from the on-board camera 3.

The road shape identifying unit 50 weights the road edge shape and the lane shape based on the first reliability level and the second reliability level for each of the left side and the right side. The road shape identifying unit 50 then identifies the weighted road edge shapes and lane shapes as the left-side shape and the right-side shape. In other words, the road shape identifying unit 50 weights the shapes on the left side and the shapes on the right side based on the reliability levels related to detection by the on-board radar 2 and the on-board camera 3 for the left side and the right side. The road shape identifying unit 50 sets the weighted average shapes as the left-side shape and the right-side shape. The road shape identifying unit 50 identifies the average shape of the left-side shape and the right-side shape as the road shape. As a result of the reliability levels being reflected in this way, recognition accuracy of the road shape can be further improved.

In addition, when the degree of coincidence is determined to be high on only either of the left side and the right side, the road shape identifying unit 50 sets the shapes on the side having the high degree of coincidence as the same-side shapes. The road shape identifying unit 50 sets the shapes on the other side as the non-same-side shapes. The road shape identifying unit 50 sets the shape, among the road edge shape and the lane shape that are the non-same-side shapes, that has a higher correlation with the same-side shape as the correlated shape. The road shape identifying unit 50 identifies the average shape of the same-side shape and the correlated shape as the road shape.

In other words, among the left-side shape and the right-side shape, the shape having a higher degree of coincidence is set as the same-side shape. The shape having a lower degree of coincidence is set as the non-same-side shape. Among the non-same-side shapes, the shape having a higher correlation with the same-side shape is set as the correlated shape. The shape obtained from an average of the same-side shape and the correlated shape is identified as the road shape. In this way, among the non-same-side shapes, the shape that has a lower correlation with the same-side shape is not used. Therefore, decrease in recognition accuracy of the road shape can be favorably suppressed.

Figure 4:
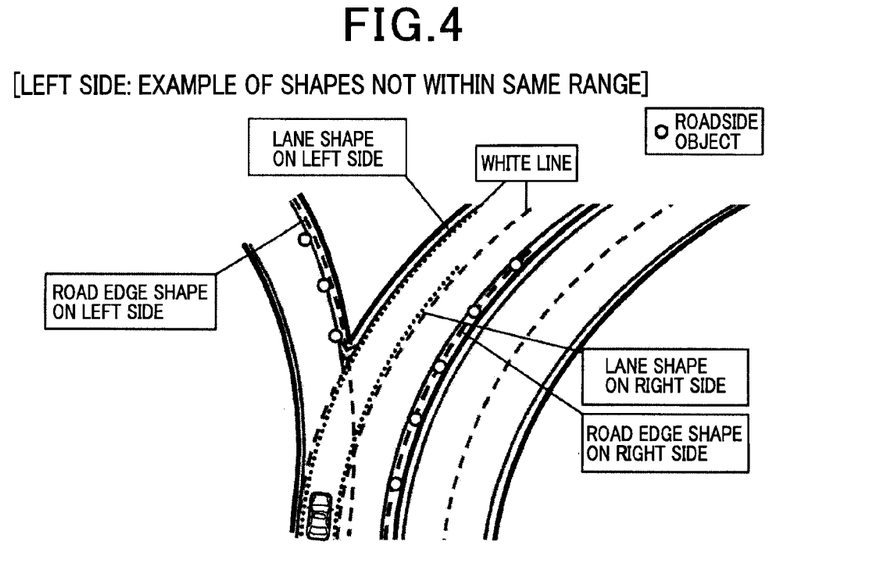
FIG. 4 is an explanatory diagram of an example of a situation in which the road edge shape and a lane shape are not within the same range.

For example, as shown in FIG. 4, in a situation in which the cruising road branches ahead of the vehicle, the same-side shapes are the road edge shape and the lane shape on the right side that have a high degree of coincidence (are within the same range). The non-same-side shapes are the road edge shape and the lane shape on the left side that are not within the same range. In addition, in this instance, among the non-same-side shapes, the lane shape (the shape of the white line on the left side near the vehicle) on the left side is the correlated shape that has a high correlation with the same-side shape on the right side.

In addition, the road shape identifying unit 50 gives greater weight to the same-side shape than the correlated shape, and identifies the average shape of the same-side shape and the correlated shape as the road shape. In other words, the same-side shape has a higher reliability level than the non-same-side shape (correlated shape). Therefore, the same-side shape is given greater weight. The weighted average shape is identified as the road shape. As a result of reflecting the reliability levels in this way as well, recognition accuracy of the road shape can be further improved.

In addition, when only either of the left and right shape recognizing unit 21 and the left and right shape recognizing unit 31 is able to recognize the non-same-side shape, the road shape identifying unit 50 applies the non-same-side shape recognized by either of the left and right shape recognizing unit 21 and the left and right shape recognizing unit 31 as the correlated shape. In other words, in a situation in which detection by only either of the on-board radar 2 and the on-board camera 3 on either of the left side and the right side is difficult, a shape that is obtained from an average of the non-same-side shape that is the recognition result based on detection by the on-board radar 2 or the on-board camera 3 that is capable of recognition and the same-side shape that is the recognition result based on the detection result of the side on which the on-board radar 2 and the on-board camera 3 are both capable of recognition is identified as the road shape. As a result, decrease in recognition accuracy of the road shape and decrease in opportunities for road shape recognition can be suppressed. Furthermore, as a result of the same-side shape being given greater weight than the non-same-side shape, a weighted average shape can be identified as the road shape.

In addition, when neither the left and right shape recognizing unit 21 nor the left and right shape recognizing unit 31 are able to identify the non-same-side shape, the road shape identifying unit 50 identifies the same-side shape as the road shape. In other words, in a situation in which detection by both the on-board radar 2 and the on-board camera 3 is difficult on either of the left side and the right side, the same-side shape that is the recognition result based on detection on either of the left side and the right side on which both the on-board radar 2 and the on-board camera 3 are able to perform recognition and of which the degree of coincidence is high is identified as the road shape. As a result of this as well, decrease in recognition accuracy of the road shape and decrease in opportunities for road shape recognition can be suppressed.

<Application Example>

Next, an application example of the road shape recognition apparatus 1 will be described.

Figure 1B:
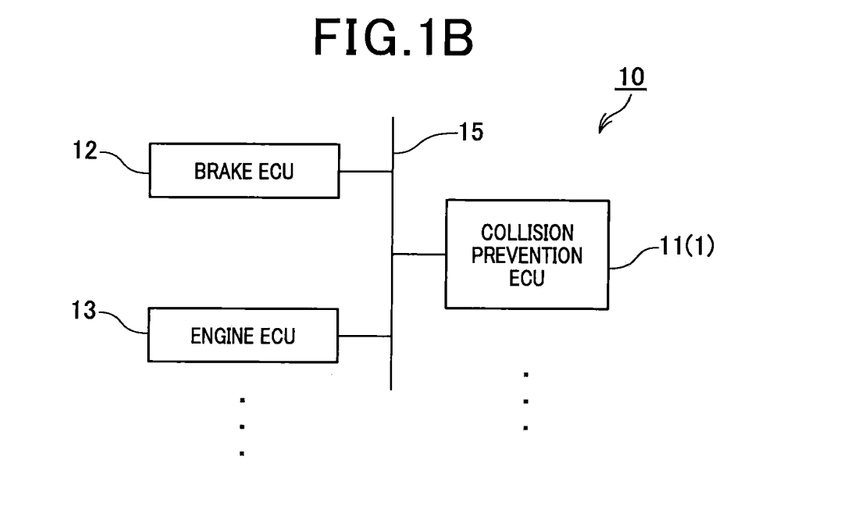
FIG. 1B is a block diagram of an example of a configuration of a vehicle control system 10.

A vehicle control system 10 shown in FIG. 1B includes a collision prevention electronic control unit (ECU) 11, a brake ECU 12, and an engine ECU 13. The collision prevention ECU 11 includes the road shape recognition apparatus 1. The ECUs 11 to 13 are capable of communicating with one another over an on-board local area network (LAN) 15. The ECUs 11 to 13 transmit and receive various types of information and control commands to and from one another. As a result, the ECUs 11 to 13 are capable of sharing detection information from the sensors and actualizing vehicle control in cooperation with other ECUs.

The brake ECU 12 controls braking of the vehicle. The brake ECU 12 includes a CPU, a ROM, a RAM, and the like. Specifically, the brake ECU 12 controls a brake ACT based on detection values from a sensor that detects the depression amount of a brake pedal. The brake ACT is an actuator that opens and closes a pressure-increase regulating valve and a pressure-decrease regulating valve provided in a hydraulic brake circuit. In addition, the brake ECU 52 controls the brake ACT to increase and decrease braking force of the vehicle based on instructions from the collision prevention ECU 11.

The engine ECU 13 controls engine start/stop, fuel injection amount, ignition timing, and the like. The engine ECU 51 includes a CPU, a ROM, a RAM, and the like. Specifically, the engine ECU 13 controls a throttle ACT based on detection values from a sensor that detects the depression amount of an accelerator pedal. The throttle ACT is an actuator that opens and closes a throttle provided in an air intake pipe. In addition, the engine ECU 13 controls the throttle ACT to increase and decrease the driving force of an internal combustion engine based on instructions from the collision prevention ECU 11.

The collision prevention ECU 11 performs control to actualize functions as a so-called pre-crash safety system (PCS). The collision prevention ECU 11 includes a CPU, a ROM, a RAM, and the like. Specifically, the collision prevention ECU 11 recognizes a caution-required target (such as another vehicle, a pedestrian, or an obstacle) present ahead of the vehicle based on the detection information from the on-board radar 2 and the captured images from the on-board camera 3. The collision prevention ECU 11 then calculates a collision likelihood and a collision leeway time (time to collision (TTC)) of a collision between the vehicle and the caution-required target, based on the relative position and the relative speed vector between the caution-required target and the vehicle. When the collision likelihood becomes high, as the TTC becomes shorter, the collision prevention ECU 11 outputs a warning to the driver. In addition, the collision prevention ECU 11 gives an instruction to the engine ECU 13 to reduce the driving force of the internal combustion engine. The collision prevention ECU 11 also gives an instruction to the brake ECU 12 to increase the braking force of the vehicle.

According to the present embodiment, the collision prevention ECU 11 advances the timing for control when the shape of the road on which the vehicle is traveling is determined to be a straight line or a shape similar to a straight line (referred to, hereinafter, as a "straight shape"), compared to when the road shape is determined to be a non-straight shape. The collision prevention ECU 11 makes the determination based on at least the recognition results from the road shape recognition apparatus 1. The collision prevention ECU 11 advances the control timing because, when the vehicle is traveling on a road that has a straight shape, when the caution-required target ahead of the vehicle is positioned at a far distance, the likelihood of a stationary object, such as a roadside object, being erroneously recognized as a caution-required target is relatively low. Recognition accuracy of the caution-required target is relatively high.

Conversely, when the vehicle is traveling on a road that has the non-straight shape (a curve), when the caution-required target ahead of the vehicle is positioned at a far distance, the likelihood of a stationary object, such as a roadside object, being erroneously recognized as a caution-required target is relatively high. Recognition accuracy of the caution-required target is relatively low. Therefore, when the shape of the road on which the vehicle is traveling is determined to be the non-straight shape based on at least the recognition results from the road shape recognition apparatus 1, the collision prevention ECU 11 delays the control timing compared to when the road shape is determined to be the straight shape. The control timing includes, for example, the timing at which the calculation of collision likelihood or TTC is started, and the timing of an instruction to the brake ECU 12 or the engine ECU 13.

In addition, the collision prevention ECU 11 determines a predicted cruising trajectory of the vehicle when calculating the collision likelihood and the TTC. Specifically, under a presumption that the vehicle maintains the current steering angle, yaw rate, and vehicle speed, based on the detection values from the cruising state sensor 6, the collision prevention ECU 11 performs an estimation by expressing the speed vector of the vehicle as a curvature (a radius of curvature according to the present embodiment). The collision prevention ECU 11 uses the estimated result (referred to, hereinafter, as an "estimated R") as the predicted cruising trajectory of the vehicle.

Figure 5:
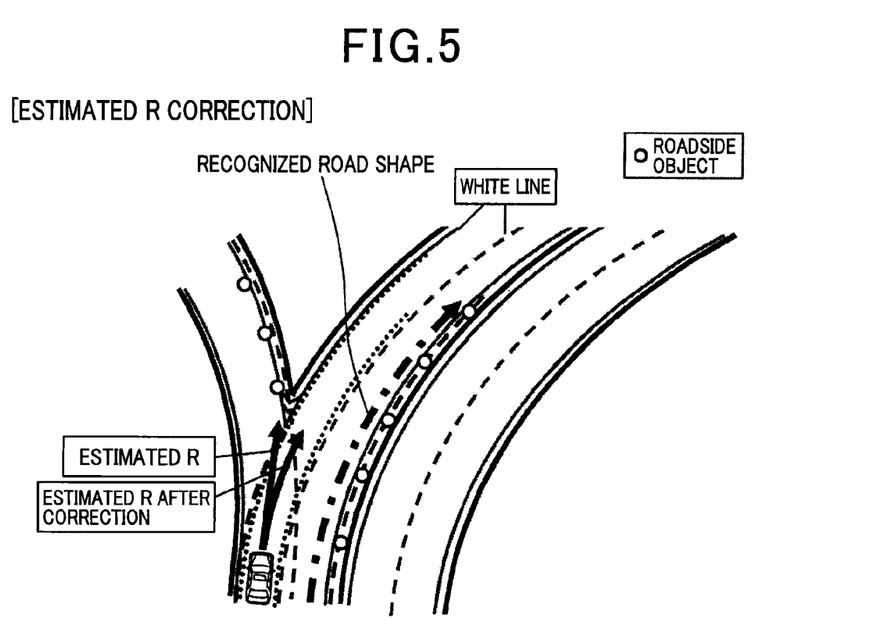
FIG. 5 is an image diagram for describing a method for correcting an estimated R.

According to the present embodiment, the collision prevention ECU 11 corrects the estimated R using the road shape recognized by the road shape recognition apparatus 1. Specifically, as shown in FIG. 5, the collision prevention ECU 11 corrects the cruising direction of the vehicle indicated by the estimated R to match the road shape recognized by the road shape recognition apparatus 1. A reason for this is that the estimated R (before correction) is determined based on the detection values from the cruising state sensor 6. For example, when the steering wheel operation by the driver of the vehicle changes frequently over a short period of time, the estimated R (before correction) may not reflect the actual predicted cruising trajectory depending on the steering angles that are based on the steering wheel operations.

In addition, according to the present embodiment, the collision prevention ECU 11 can identify the shape of the road on which the vehicle is traveling using the estimated R that has been corrected as described above. Specifically, the collision prevention ECU 11 may determine that the road shape is the straight shape when the estimated R after correction is greater than a predetermined first reference value. The collision prevention ECU 11 may then advance the control timing. When the estimated R after correction is smaller than a predetermined second reference value, the collision prevention ECU 11 may determine that the road shape is the non-straight shape (a relatively large curve). The collision prevention ECU 11 may then delay the control timing.

In addition, according to the present embodiment, the collision prevention ECU 11 determines that a caution-required target is crossing in front of the vehicle based on the speed vector of the caution-required target. The collision prevention ECU 11 then determines whether or not the caution-required target will be positioned within a threshold area based on the width of the vehicle at a timing at which the TTC regarding the caution-required target such as this becomes zero. Then, when determined that the caution-required target will be positioned within the threshold area, the collision prevention ECU 11 determines that the collision likelihood is high.

In this instance, when the collision prevention ECU 11 has determined that the road shape is the straight shape (the estimated R after correction is large) based on at least the recognition results from the road shape recognition apparatus 1, the collision prevention ECU 11 may increase the threshold area, thereby advancing the control timing. When determined that the road shape is the non-straight shape (the estimated R after correction is small), the collision prevention ECU 11 may reduce the threshold area, thereby delaying the control timing.

Second Embodiment

Next, a second embodiment of the present invention will be described. The basic configuration according to the second embodiment is similar to that according to the first embodiment. Therefore, descriptions related to common configurations will be omitted. Differences will mainly be described.

According to the above-described first embodiment, the left and right shape recognizing unit 21 sends, to the road shape identifying unit 50, information indicating an aggregation of detection points (positional coordinates) of a roadside object as the road edge shape information. The left and right shape recognizing unit 31 sends, to the road shape identifying unit 50, information indicating an aggregation of detection points (positional coordinates) of a lane boundary line as the lane shape information.

The road shape identifying unit 50 then compares the positional coordinates indicated in the road edge shape information and the positional coordinates indicated in the lane shape information, for each detection point corresponding to the distance in the cruising direction of the vehicle. Based on the comparison results for all detection points, the road shape identifying unit 50 determines the degree of coincidence and the like between the road edge shape and the lane shape.

Figure 6:
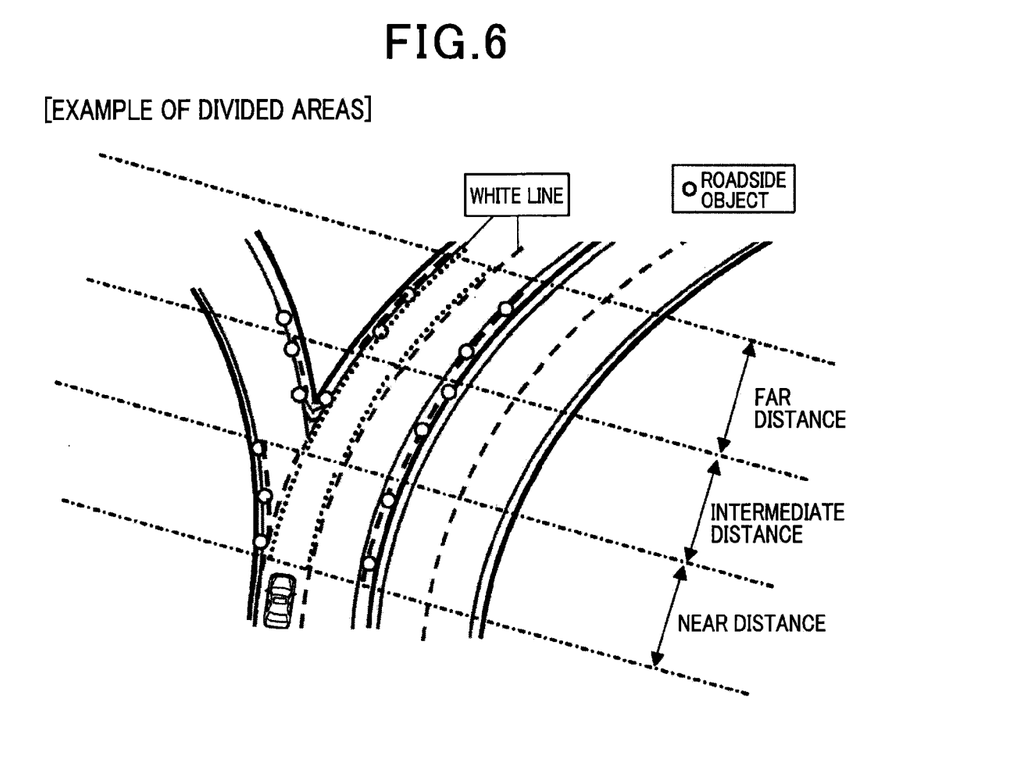
FIG. 6 is an image diagram for describing divided areas.

Conversely, according to the second embodiment, as shown in FIG. 6, a plurality of divided areas are set in advance in the cruising direction of the vehicle, based on the distance in the cruising direction of the vehicle (also referred to, hereinafter, as simply "distance"). For example, the divided areas are a near-distance area, an intermediate-distance area, and a far-distance area in order from the area closest to the vehicle.

Specifically, according to the second embodiment, at least either of the left and right shape recognizing unit 21 and the left and right shape recognizing unit 31 sets the sizes (distances) of the divided areas such as those described above. At least either of the left and right shape recognizing unit 21 and the left and right shape recognizing unit 31 (both according to the present embodiment) calculates the curvature for each of the set divided areas based on the detection points (positional coordinates) of the detection subject (roadside object or lane boundary line). At least either of the left and right shape recognizing unit 21 and the left and right shape recognizing unit 31 then sends the calculated results to the road shape identifying unit 50 as the road edge shape information and the lane shape information.

Then, the road shape identifying unit 50 compares the curvature indicated in the road edge shape information and the curvature indicated in the lane shape information, for each divided area corresponding to the distance in the cruising direction of the vehicle. The road shape identifying unit 50 determines the degree of coincidence and the like between the road edge shape and the lane shape based on the comparison results for all divided areas.

In other words, the second embodiment significantly differs from the first embodiment in that, according to the second embodiment, the left and right shape recognizing unit 21 and the left and right shape recognizing unit 31 recognize the road edge shape and the lane shape (collectively referred to as a "boundary shape") based on the curvatures of the plurality of divided areas.

According to the second embodiment, the road shape identifying unit 50 sends the information indicating the road shape to the left and right shape recognizing unit 21 and the left and right shape recognizing unit 31 as the recognition result. The reliability level determining unit 22 and the reliability level determining unit 32 respectively send the first reliability level information and the second reliability level information to the left and right shape recognizing unit 21 and the left and right shape recognizing unit 31.

<Area Setting Process>

Figure 7:
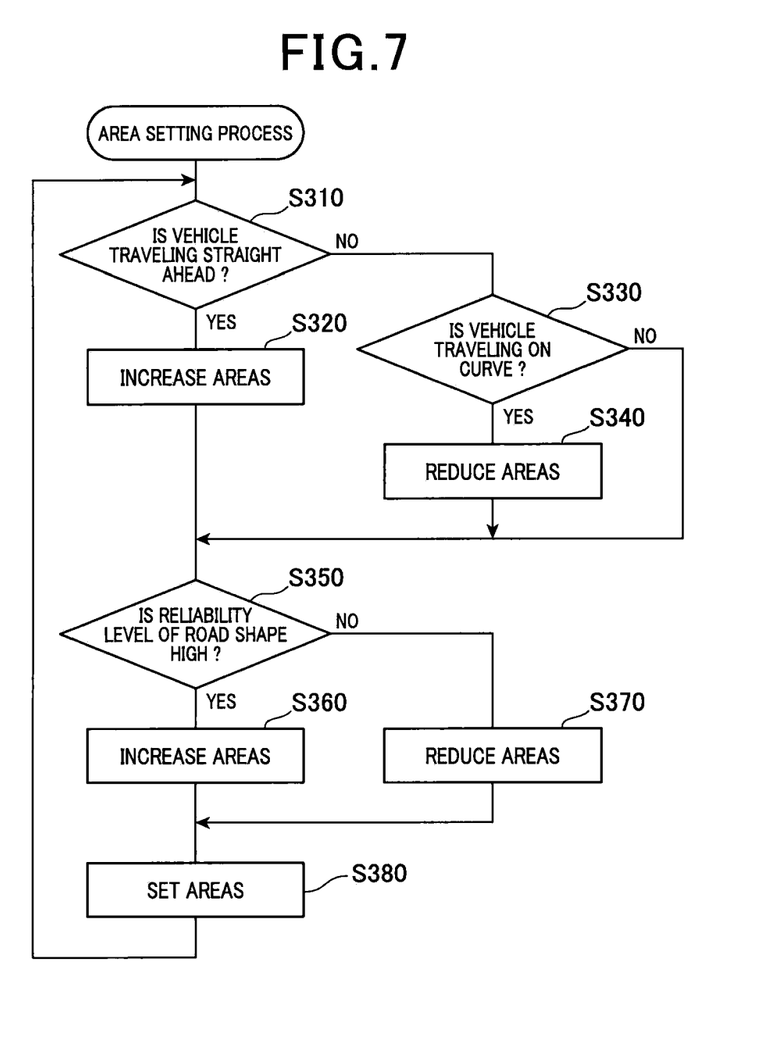
FIG. 7 is a flowchart of an example of the details of an area setting process performed by the control unit 5 of the road shape recognition apparatus 1.

Among the processes performed by the control unit 5 to actualize the functions as at least either of the left and right shape recognizing unit 21 and the left and right shape recognizing unit 31, there is an area setting process for variably setting the sizes (distances) of the divided areas. The area setting process will hereinafter be described with reference to the flowchart in FIG. 7. The process shown in FIG. 7 is repeatedly performed at a predetermined cycle. The control unit 5 that performs the area setting process will hereinafter be referred to as the left and right shape recognizing unit 231 in the description.

When the area setting process is started, at S310, the left and right shape recognizing unit 231 determines whether or not the road shape is the straight shape (the estimated R after correction is large) based on at least the processing result from the road shape identifying unit 50. Then, when determined that the road shape is the straight shape, the left and right shape recognizing unit 231 determines that the vehicle is traveling straight ahead and proceeds to S320. When determined that the road shape is not the straight shape, the left and right shape recognizing unit 231 proceeds to S330.

At S320, the left and right shape recognizing unit 231 adds to the value (counter value) of a counter that is provided in advance to variably set the sizes (distances) of all divided areas. The left and right shape recognizing unit 231 adds to the counter value to increase the distances and proceeds to S350.

At S330, the left and right shape recognizing unit 231 determines whether or not the road shape is the non-straight shape (the estimated R after correction is small) based on at least the processing result from the road shape identifying unit 50. When determined that the road shape is the non-straight shape, the left and right shape recognizing unit 231 determines that the vehicle is traveling on a curve and proceeds to S340. When determined that the road shape is neither the straight shape nor the non-straight shape, the left and right shape recognizing unit 231 determines that the vehicle is traveling on a gently curving road and proceeds to S350.

At S340, the left and right shape recognizing unit 231 subtracts from the counter value to reduce the distances and proceeds to S350.

At S350, the left and right shape recognizing unit 231 determines whether or not the reliability level of the identification result of the road shape by the road shape identifying unit 50 is high, based on the determination results from the reliability determining unit 22 and the reliability determining unit 32. When determined that the reliability level is high, the left and right shape recognizing unit 231 proceeds to S360. When determined that the reliability level is low, the left and right shape recognizing unit 231 proceeds to S370. The reliability level herein can be expressed by, for example, a total sum of the first reliability level and the second reliability level.

At S360, the left and right shape recognizing unit 231 adds to the counter value to increase the distances and proceeds to S380. At S370, the left and right shape recognizing unit 231 subtracts from the counter value to reduce the distances and proceeds to S350.

At S380, the left and right shape recognizing unit 231 variably sets the distances of the divided areas based on the counter value that has been added to and subtracted from in the processes at S310 to S370. The left and right shape recognizing unit 231 increases the sizes (distances) of all divided areas as the counter value increases. The left and right shape recognizing unit 231 reduces the sizes (distances) of all divided areas as the counter value decreases. The left and right shape recognizing unit 231 then returns to S310.

<Effects>

As described above, according to the second embodiment, the left and right shape recognizing unit 231 detects (extracts) the positions of the detection subject for each divided area that is set in advance in the cruising direction of the vehicle. The left and right shape recognizing unit 231 then calculates the curvature of each divided area based on the extracted positions. The left and right shape recognizing unit 231 recognizes the boundary shape using the plurality of curvatures based on the calculation results.

As a result of the boundary shape being recognized using the plurality of curvatures in this way, compared to when the boundary shape is recognized using the positional coordinates of the detected positions, the boundary shape can be simplified. As a result, processing load on the road shape identifying unit 50 can be reduced.

In addition, the left and right shape recognizing unit 231 variably sets the distances in the cruising direction of the vehicle of the divided areas based on the road shape identified by the road shape identifying unit 50.

As a result of the road shape identified by the road shape identifying unit 50 being fed back and the divided areas (distances) being variably set in this way, calculation accuracy of the curvature of each divided area can be improved.

In addition, when the road shape is a straight line or a shape similar to a straight line (referred to, hereinafter, as a "straight shape"), the left and right shape recognizing unit 231 expands the divided areas (distances). When the road shape is the non-straight shape, the left and right shape recognizing unit 231 reduces the divided areas (distances).

As a result of the divided areas (distances) being variably set in this way, when the road shape is the straight shape, the road shape can be identified to a position at a far distance using the plurality of curvatures. When the road shape is the non-straight shape, the road shape can only be identified to a position at a near distance using the plurality of curvatures. However, in this instance, decrease in recognition accuracy of the road shape can be favorably suppressed.

In addition, the left and right shape recognizing unit 231 variably sets the distances in the cruising direction of the vehicle of the divided areas based on the reliability level of the identification result of the road shape. Specifically, when the reliability level is high, the left and right shape recognizing unit 231 expands the divided areas (distances). When the reliability level is low, the left and right shape recognizing unit 231 reduces the divided areas (distances).

As a result of the divided areas (distances) being variably set in this way, when the reliability of the identification result of the road shape is high, the road shape can be identified to a position at a far distance using the plurality of curvatures. When the reliability level of the identification result of the road shape is low, the road shape can only be identified to a position at a near distance using the plurality of curvatures. However, in this instance, decrease in recognition accuracy of the road shape can be favorably suppressed.

<Other Embodiments>

The embodiments of the present invention are described above. However, the present invention is not limited by the above-described embodiments. Various aspects are possible without departing from the scope of the present invention.

For example, in the vehicle control system 10 according to the above-described embodiment, the collision prevention ECU 11 is described as an example of an ECU that uses the recognition result from the road shape recognition apparatus 1. However, this is not limited thereto. The road shape recognition apparatus 1 can also be applied to other ECUs that perform control to actualize functions as a known auto cruise control system, lane keeping system, or the like.

What is claimed is:

1. An apparatus that is mounted in a vehicle and recognizes a shape of a road on which the vehicle is traveling, the apparatus comprising:
    first recognizing means for recognizing road edge shapes on a left side and a right side of the vehicle, from positions of roadside objects detected based on detection information from an on-board radar;
    second recognizing means for recognizing lane shapes that are shapes of lane boundary lines on the left side and the right side of the vehicle, from positions of lane boundary lines detected based on an image captured by an on-board camera;
    identifying means for (i) determining, for each of the left side and the right side, whether or not a degree of coincidence between the road edge shapes recognized by the first recognizing means and the lane shapes recognized by the second recognizing means is high, the degree of coincidence being selectively set to be either high or low, and (ii) identifying a shape of the road based on results of the determination, for each of the left side and the right side, of whether or not the degree of coincidence between the road edge shapes recognized by the first recognizing means is high.

2. The apparatus according to claim 1, wherein the identifying means identifies the shape of the road only when the degree of in at least one of the left and right sides is determined as being high.

3. The apparatus according to claim 2, wherein the identifying means is activated when it is determined that the degree of coincidence is high in both the left and right sides, and
    the identifying means identifies, when being activated, a left-side shape which is an average shape of one or both of a left-side road edge shape and a left-side lane shape, a right-side shape which is an average shape of one or both of a right-side road edge shape and a right-side lane shape, and an average shape of the left- and right-side shapes as the shape of the road.

4. The apparatus according to claim 3, comprising:
    first reliability determining means for determining, for each of the right and left sides, a first reliability assigned to the recognized road edge shape based on the detection information; and
    second reliability determining means for determining, for each of the right and left sides, a second reliability assigned to the recognized lane shape based on the captured image,
    wherein the identifying means determines, as the left- and right-side shapes, average shapes of both the road edge shape and the lane shape subjected to weighting based on the first and second reliabilities.

5. The apparatus according to claim 3, wherein each of the first and second recognizing means recognizes a same-side shape and a non-same-side shape, and
    the identifying means identifies the shape of the road by applying to a correlation shape the non-same-side shape recognized successfully by only one of the first and second recognizing means.

6. The apparatus according to claim 3, wherein the identifying means identifies as the shape of the road a same-side shape when both the first and second recognizing means fail to recognize a non-same-side shape.

7. The apparatus according to claim 2, wherein the identifying means is activated when it is determined that the degree of coincidence is high in only one of the left and right sides, and
    the identifying means sets i) the one of the right and left sides as a same-side shape, ii) the other of the right and left sides as a non-same-side shape, and iii) a correlation shape which is higher in correlation with the same-side shape among the road edge shapes and the lane shapes which are set as the non-same-side shape, and identifies, as the shape of the road, an average shape calculated between the same-side shape and the correlation shape.

8. The apparatus according to claim 2, wherein, when at least one of the first and second recognizing means is designated recognizing means and at least one of the road edge shapes and the lane shapes, recognized by the designated recognizing means, is set to be a boundary shape,
    the designated recognizing means detects a position of an object in each of divided areas previously set in a cruising direction of the vehicle, calculates a curvature of each of the divided areas based on the detected positions, and recognizes the boundary shape based on the calculated curvatures.

9. The apparatus according to claim 8, wherein the designated recognizing means variably sets distances of the respective divided areas in a cruising direction of the vehicle, depending on the shape of the road identified by the identifying means.

10. The apparatus according to claim 9, wherein the designated recognizing means makes the distances larger when the shape of the road is linear, a straight line or a shape similar to a straight line, which is regarded as being linear and makes the distances smaller when the shape of the road is not regarded as being linear.

11. The apparatus according to claim 1, wherein the identifying means is activated when it is determined that the degree of coincidence is high in both the left and right sides, and
    the identifying means identifies, when being activated, a left-side shape which is an average shape of one or both of a left-side road edge shape and a left-side lane shape, a right-side shape which is an average shape of one or both of a right-side road edge shape and a right-side lane shape, and an average shape of the left- and right-side shapes as the shape of the road.

12. The apparatus according to claim 11, comprising:
    first reliability determining means for determining, for each of the right and left sides, a first reliability assigned to the recognized road edge shape based on the detection information; and
    second reliability determining means for determining, for each of the right and left sides, a second reliability assigned to the recognized lane shape based on the captured image,
    wherein the identifying means determines, as the left- and right-side shapes, average shapes of both the road edge shape and the lane shape subjected to weighting based on the first and second reliabilities.

13. The apparatus according to claim 1, wherein the identifying means is activated when it is determined that the degree of coincidence is high in only one of the left and right sides, and
    the identifying means sets i) the one of the right and left sides as a same-side shape, ii) the other of the right and left sides as a non-same-side shape, and iii) a correlation shape which is higher in correlation with the same-side shape among the road edge shapes and the lane shapes which are set as the non-same-side shape, and identifies, as the shape of the road, an average shape calculated between the same-side shape and the correlation shape.

14. The apparatus according to claim 13, wherein the identifying means identifies, as the shape of the road, the average shape calculated between the same-side shape and the correlation shape, the same-side shape being subjected to weighting with a factor larger than a factor for weighting the correlation shape.

15. The apparatus according to claim 1, wherein, when at least one of the first and second recognizing means is designated recognizing means and at least one of the road edge shapes and the lane shapes, recognized by the designated recognizing means, is set to be a boundary shape, the designated recognizing means detects a position of an object in each of divided areas previously set in a cruising direction of the vehicle, calculates a curvature of each of the divided areas based on the detected positions, and recognizes the boundary shape based on the calculated curvatures.

16. The apparatus according to claim 15, wherein the designated recognizing means variably sets distances of the respective divided areas in a cruising direction of the vehicle, depending on the shape of the road identified by the identifying means.

17. The apparatus according to claim 16, wherein the designated recognizing means makes the distances larger when the shape of the road is linear, a straight line or a shape similar to a straight line, which is regarded as being linear and makes the distances smaller when the shape of the road is not regarded as being linear.

18. A computer readable program stored in a non-transitory computer-readable storage medium and enables a computer to function as the first and second recognizing means and the identifying means according to claim 1.

19. A non-transitory recording medium in which a computer readable program is stored in a memory, the program enabling a computer to function as the first and second recognizing means and the identifying means according to claim 1.

* * * * *